United States Patent Office 3,034,856

Patented May 15, 1962

1

3,034,856

PURIFICATION OF SODIUM DIURANATE

Robert E. Reusser, Bartlesville, Okla., assignor to Phillips Petroleum Company, a corporation of Delaware No Drawing. Filed Dec. 31, 1959, Ser. No. 863,073
6 Claims. (Cl. 23—14.5)

This invention relates to the recovery of uranium from uranium-bearing materials, such as coffinite and other ores, by the carbonate leaching process. More particularly, it relates to the purification of sodium diuranate ("yellow cake") obtaining by the carbonate leaching process.

An important and widely used hydrometallurgical process for recovering uranium from uranium-bearing materials is the "carbonate leaching process." This leaching process has been applied to both primary and secondary uranium mineral deposits, such as pitchblende, coffinite, carnotite, uraninite, tyuyamunite, and the like, etc., but the process is especially useful when leaching ore of high carbonate content. It is this leaching process that is the concern of the subject invention.

The carbonate leaching process for extracting uranium values from uranium-bearing materials comprises contacting crushed uranium-bearing ore with hot aqueous alkaline carbonate-bicarbonate leaching solution and, where the material contains uranium in the quadrivalent state, an oxidizing agent such as permanganate or air, to form a slurry of insoluble leached pulp and pregnant leach solution containing the stable, soluble uranyl tricarbonate complex anion. The pregnant leach solution is then separated from the tailings, for example by multi-stage vacuum filtration, and the uranium values are precipitated from clarified pregnant leach solution, for example by the addition of an excess of sodium hydroxide. The precipitate-containing leach solution is thickened and the precipitate, sodium diuranate (called "yellow cake"), is then separated, for example by filtration, from the carbonate solution. The carbonate solution recovered from the thickening operation is commonly called "barren liquor" and it is regenerated by passing carbon dioxide through it, using, for example, a supply of waste carbon dioxide, such as flue gas. The recarbonated barren liquor is then used as a wash liquor in the separation of the tailings from the pregnant leach solution and then recycled to the process for reuse as leaching solution. The filtered yellow cake is then generally dried, packaged, and sold to the Atomic Energy Commission.

Many other metals, especially vanadium, are commonly associated with uranium in uranium-bearing ores. Other metals associated with uranium-bearing ores include iron, titanium, barium, aluminum, antimony, cobalt; nonmetallic elements, such as phosphorous and silicon, are also commonly associated with uranium-bearing ores. These other metals and nonmetals, especially vanadium, are commonly extracted with the uranium values in the carbonate leaching step and gradually build up in concentration in the process. For example, a typical secondary uranium ore such as coffinite will contain about 0.25% $U_3O_8$ and 0.1% $V_2O_5$, and during the leaching step about 10 to 20% of the vanadium present in the ore will also be leached. During the subsequent precipitation of the pregnant leach solution with caustic, some of the vanadium values present in the pregnant liquor will also be precipitated together with the uranium values, for example 40 to 60% of the $V_2O_5$ present in the pregnant liquor will precipitate with the yellow cake. In fact, up to 85% of the vanadium extracted from the ore may turn up in the yellow cake produced. The other metals and nonmetals, present as impurities in the pregnant liquor will also tend to be precipitated with the yellow cake or become occluded therein. Thus, an impure yellow cake product is often obtained, and, for example, the vanadium content of the yellow cake will often be considerable, e.g., 2 to 7 weight percent.

The presence of these other metals and nonmetals in the yellow cake, especially the presence of vanadium, is undesirable because it renders the subsequent conversion of the yellow cake into uranium metal, or into other uranium compounds such as the hexachloride, much more difficult. The Atomic Energy Commission, the purchaser of all the yellow cake produced in this country, penalizes producers of yellow cake if the purity of the yellow cake is not as high as desirable, and it will even refuse to purchase such impure yellow cake. In the case of the vanadium impurity, the Atomic Energy Commission may exact a penalty if the vanadium content, expressed as $V_2O_5$, exceeds 2 weight percent of the $U_3O_8$ in the yellow cake, or the AEC may refuse to buy the yellow cake if the vanadium contaminant content is excessive. In many cases, the vanadium content of the yellow cake may be as high as 6 or 7 percent. Thus, there has arisen a need for an improved method for producing a purer yellow cake, especially a yellow cake having a relatively low vanadium content.

Accordingly, an object of this invention is to improve the recovery of uranium from uranium-bearing materials. Another object is to provide an improved method for recovering uranium values from uranium ores treated according to the carbonate leaching process. Another object is to purify the sodium diuranate, yellow cake, obtained by the carbonate leaching process for uranium ores. Another object is to substantially remove metals, such as vanadium, zirconium, iron, titanium, barium, aluminum, antimony and cobalt, and such nonmetallic elements as phosphorous and silicon, commonly associated with uranium-bearing materials, from yellow cake produced by the carbonate leaching process. Another object is to lower the vanadium content of yellow cake produced according to the carbonate leaching process. Other objects and advantages of this invention will become apparent to those skilled in the art, without departing from the scope and spirit of this invention, from the following discussion and appended claims.

Briefly stated, the subject invention provides a method for purifying sodium diuranate by contacting the same with sulfamic acid ($HSO_3NH_2$), precipitating the soluble uranium values present in the resulting sulfamic acid solution as sodium diuranate, and recovering the latter. The yellow cake containing the sodium diuranate is contacted with aqueous sulfamic acid solution and the residue or precipitate of complex and unknown structure subsequently is separated, this residue containing a higher percentage of the metallic and nonmetallic impurities than the original or initial yellow cake produced by the carbonate leaching process. After the residue is separated from the sulfamic acid solution, the dissolved uranium values in the solution are recovered therefrom by reprecipitation as sodium diuranate.

The smaller the amount of sulfamic acid used according to this invention, the greater the amount of resulting residue, and the greater the purity of the reprecipitated yellow cake. However, when using a smaller amount of the sulfamic acid, the subsequent yield of reprecipitated yellow cake is lower than when using a larger amount of sulfamic acid. In some cases, this lower yield of yellow cake will be desired, especially where a higher purity yellow cake is required. In other cases, a less pure, higher yield of reprecipitated yellow cake can be produced by using a larger amount of sulfamic acid, this treatment producing less residue. But a high yield of reprecipitated yellow cake may be desired since even in this case the reprecipitated yellow cake will contain a lower content of the metallic and nonmetallic impurities than the original or initial yellow cake produced by the carbonate leaching process, i.e., below the penalty level—in the case of the vanadium impurity, below 2 weight percent, based on the $U_3O_8$ content. When smaller volumes of less concentrated sulfamic acid are employed, only a portion of the yellow cake is dissolved, leaving an impure residue behind. If larger amounts of sulfamic acid are employed, all of the yellow cake goes into solution, after which a residue forms and settles out. In either case, the residue contains a higher percentage of the original impurities than the yellow cake which is subsequently precipitated from solution.

The amount of aqueous sulfamic acid used according to this invention generally will be an amount sufficient to render the reprecipitated yellow cake purer than the original yellow cake. Generally, the weight ratio of sulfamic acid to the initial yellow cake will be within the range of 0.2 and 1.75, preferably within the range of 0.7 and 1.6. As mentioned above, the degree of purification will determine, to a certain degree, the optimum weight ratio of the sulfamic acid to the yellow cake. If it is desired to remove as much of the impurities as possible, especially the vanadium impurity, from the yellow cake, the weight ratio will preferably be in the lower end of the above range. If it is desired to produce a yellow cake which contains as much impurities as possible without going over the penalty levels, then the ratio in the upper part of the above range will be utilized. If the optimum value of minimum residue and greatest purity of the yellow cake is desired, a weight ratio within the preferred range of from 0.8 to 1.0 parts by weight of sulfamic acid per part by weight of yellow cake is employed.

The sulfamic acid used in this invention is an aqueous solution of sulfamic acid containing from 0.5 to 25 weight percent acid; thus, the volume of acid per weight or volume of yellow cake will be determined by the acid concentration and the weight ratio of sulfamic acid to yellow cake which is to be employed. As described above, the weight ratio of sulfamic acid to yellow cake will be determined by the desired purity of the yellow cake and the amount of residue which is desired to be obtained.

The temperature of the sulfamic acid treatment will also determine, to a certain degree, the purity of the resulting reprecipitated yellow cake. Higher temperatures generally result in a greater weight percent of residue formed but also produce a more pure yellow cake; conversely, colder temperatures will produce less residue and a more impure yellow cake product. Generally, the temperature at which the yellow cake is contacted with the aqueous solution of sulfamic acid will be in the range of about 20 and 100° C.

The following detailed discussion presents a preferred set of conditions used in obtaining the objects and advantages of this invention.

In purifying sodium diuranate according to the preferred operation of this invention, the yellow cake is mixed with aqueous sulfamic acid, thus causing at least a portion of the yellow cake to be dissolved. The temperature of this treatment depends on the desired purity of the subsequently reprecipitated yellow cake, but in a typical run, the yellow cake and acid are mixed together at room temperature (approximately 25° C.) and the resulting mixture is heated to the boiling point (approximately 100° C.). The solution is maintained at this temperature or some other chosen temperature for at least 2 minutes, and generally in the range of 30 minutes to 3 hours. At the end of the reaction time, the solution is cooled to ambient temperature and filtered to remove the residue. The soluble uranium values remain in solution in the filtrate, and these uranium values are recovered from this solution, for example, by raising the pH thereof from about 8.0 to about 9.5 with the addition of a basic material. Any of the alkali metal hydroxides can be employed to raise this pH and cause the subsequent precipitation of the soluble uranium values, but it is preferred to utilize an alkali metal hydroxide which corresponds to the uranate being purified. Thus, if sodium diuranate is being purified, aqueous sodium hydroxide, having a concentration of about 10 to 25 weight percent, will be utilized to precipitate the soluble uranium values. After reprecipitating the sodium diuranate, the sulfamic acid contains an extremely low amount of uranium values, usually less than 0.002 gram per liter of $U_3O_8$; further treatment for the recovery of these low uranium values is generally not practical. The aqueous solution of sodium sulfamate can then be reacidified with sulfuric acid to recover the sulfamic acid for reuse in the process.

The process of the present invention can be carried out either batchwise or continuously, although in large scale commercial plants it is most likely that a continuous method would be employed. The residues resulting from this sulfamic acid treatment can be treated by a variety of methods for the recovery of the various metallic values therefrom, or they can be discarded.

The following examples further illustrate the objects and advantages of this invention, but it should be understood that the various amounts, conditions, etc., expressed in these examples are merely illustrative and should not be construed so as to unduly limit this invention.

EXAMPLE I

Two impure yellow cake samples, were obtained from a commercial carbonate leaching plant and treated with various concentrations of sulfamic acid, according to the practice of this invention. In each of these runs, 15 g. of the yellow cake were mixed with 500 ml. of aqueous sulfamic acid. The mixtures were heated to 90–100° C., except in one run where the mixture was maintained at room temperature (approximately 25° C.), and held at this temperature for one hour with agitation. Each mixture was then cooled to room temperature and the residue which formed was filtered off. The filtrate was then treated to reprecipitate the dissolved yellow cake by adding aqueous sodium hydroxide until pH 8.0–9.5 was reached. The residue and the reprecipitated yellow cake was then analyzed. The barren liquors after reprecipitation were extremely low in uranium content (less than 0.002 g./l. $U_3O_8$) in all runs. In all these runs, the yellow cake dissolved almost completely as soon as the sulfamic acid solution was heated. The residue did not appear until the material was heated. The results of this investigation are set forth in Table I.

*Table I*

| Run No. | Composition of yellow cake sample | | Wt. ratio of pure sulfamic acid to yellow cake sample | Aq. sulfamic acid conc., calc. wt. percent | Residue | | | Composition of reppted. yellow cake | |
|---|---|---|---|---|---|---|---|---|---|
| | Wt. percent $V_2O_5$ | Wt. percent $U_3O_8$ | | | Wt. percent of orig. yellow cake | Wt. percent of orig. $U_3O_8$ in residue | Wt. percent of orig. $V_2O_5$ in residue | $Na_3VO_4$ calc. as Wt. percent $V_2O_5$ | $Na_2U_2O_7$ calc. as Wt. percent $U_3O_8$ |
| 1 | 1.80 | 78.03 | 0.03 | 0.09 | 95.2 | 99.85 | ---------- | ---------- | ---------- |
| 2 | 1.80 | 78.03 | 0.27 | 1.1 | 74.5 | ---------- | 100.0 | ---------- | ---------- |
| 3 | 1.80 | 78.03 | 0.87 | 2.6 | 16.9 | ---------- | 100.0 | ---------- | ---------- |
| 4 | 1.80 | 78.03 | 1.0 | 2.96 | 11.5 | 13.7 | 66.0 | 0.66 | 88.03 |
| 5 [1] | 1.80 | 78.03 | 1.0 | 2.96 | 5.0 | 3.1 | ---------- | 1.26 | 86.69 |
| 6 | 1.80 | 78.03 | 2.0 | 5.84 | 0.5 | 1.6 | ---------- | 1.89 | 85.84 |
| 7 | 2.86 | 77.63 | 0.5 | 1.49 | 45.1 | 42.9 | ---------- | 0.017 | 85.45 |
| 8 | 2.86 | 77.63 | 0.75 | 2.23 | 20.7 | 13.3 | ---------- | 0.003 | 85.79 |
| 9 | 2.86 | 77.63 | 1.25 | 3.69 | 7.1 | 3.7 | 78.8 | 0.58 | 84.08 |
| 10 | 2.86 | 77.63 | 1.50 | 4.42 | 4.8 | 2.2 | 49.6 | 1.53 | 84.54 |

[1] In this run the sulfamic acid solution was maintained at room temperature (approx. 25° C.) for one hour.

The data in Table I show that the reprecipitated yellow cake, prepared according to this invention, has a higher purity as compared to the original yellow cake. The data also show that greater amounts of sulfamic acid used in treating the original yellow cake result in higher yields of reprecipitated yellow cake, and, conversely, that lower amounts of sulfamic acid result in lower yields of purer reprecipitated yellow cake.

The residues from run numbers 4, 5, and 6, of Table I were analyzed by semi-quantitative spectrographic methods. The results of these analyses are reported in Table II.

*Table II*

| Run No. | Element in Residue, Wt. percent | | | | | | | | | | | | |
|---|---|---|---|---|---|---|---|---|---|---|---|---|---|
| | U | V | P | Zr | Fe | Cu | Pb | Li | Si | Ba | Al | Sb | Co |
| 4 | 50–70 | 5 | 3.5 | >5 | 1.2 | ---------- | ---------- | 0.078 | 0.37 | 0.034 | ---------- | ---------- | ---------- |
| 5 | 5–10 | 0.22 | 10 | 0.22 | 3.0 | ---------- | 1.2 | 1.2 | 2.5 | 0.87 | 0.43 | Trace | ---------- |
| 6 | 50 | 5 | 5 | 1.8 | 2.5 | 0.039 | ---------- | 0.18 | 0.53 | 0.034 | 0.62 | 0.01 | 0.22 |

The data in Table II show that the sulfamic acid treatment of yellow cake, according to the practice of this invention, serves to remove other metallic and nonmetallic impurities in addition to removing vanadium.

Various modifications and alterations of this invention will become apparent to those skilled in the art from the foregoing discussion, and it should be understood that the subject invention is not to be unduly limited to the examples set forth above for illustrative purposes.

I claim:

1. A method for purifying yellow cake comprising sodium diuranate obtained by extracting uranium values from uranium-bearing materials according to the carbonate leaching process, which method comprises treating said yellow cake with aqueous sulfamic acid in an amount sufficient to dissolve at least a portion of said sodium diuranate, separating the resulting residue from the resulting sulfamic acid solution, neutralizing the resulting separated sulfamic acid solution with aqueous sodium hydroxide to precipitate the uranium values present in said sulfamic acid solution as sodium diuranate, and recovering the resulting precipitate from the resulting neutralized solution.

2. The method according to claim 1 wherein the weight ratio of sulfamic acid to yellow cake is in the range of about 0.2 and 1.75.

3. The method according to claim 1 wherein the weight ratio of sulfamic acid to yellow cake is in the range of about 0.8 and 1.

4. The method according to claim 1 wherein the amount of sulfamic acid used is sufficient to yield a reprecipitated sodium diuranate product having a vanadium content of less than about 2 weight percent $V_2O_5$, based on the weight percent $U_3O_8$.

5. A method for purifying yellow cake comprising sodium diuranate obtained by extracting uranium values from uranium-bearing materials according to the carbonate leaching process, which method comprises treating said yellow cake with an 0.5 to 25 weight percent aqueous sulfamic acid solution, the weight ratio of sulfamic acid to yellow cake being in the range of about 0.7 to 1.6, the temperature of said treatment being the range of about 20 to 100° C., filtering the resulting residue from the resulting sulfamic acid solution, treating the resulting filtered sulfamic acid solution with an amount of aqueous sodium hydroxide sufficient to raise the pH of said sulfamic acid solution to a pH in the range of about 8 to 9.5 and precipitate the uranium values present in said sulfamic acid solution as sodium diuranate, and filtering the resulting neutralized solution to recover purified sodium diuranate therefrom.

6. A method for purifying yellow cake comprising sodium diuranate obtained by extracting uranium values from uranium-bearing materials according to the carbonate leaching process, which method comprises treating said yellow cake with aqueous sulfamic acid, clarifying the resulting sulfamic acid solution, and recovering pure yellow cake from the resulting clarified sulfamic acid solution.

References Cited in the file of this patent

UNITED STATES PATENTS

| | | |
|---|---|---|
| 2,813,003 | Thunaes | Nov. 12, 1957 |
| 2,849,277 | Thomas | Aug. 26, 1958 |
| 2,874,025 | Moore | Feb. 17, 1959 |
| 2,900,229 | McClaine | Aug. 18, 1959 |

OTHER REFERENCES

AEC Document TID-7543, pages 45–68, May 20-25, 1957.

Harrington et al.: "Uranium Production Technology," page 137 (1959). (Copy in Sci. Library, Rcd. Feb. 16, 1960.)

Bruce et al.: "Process Chemistry," page 285 (1956), Pergamon Press, (Copy in Sci. Library.)